United States Patent [19]

Robbins, III

[11] Patent Number: 5,100,607
[45] Date of Patent: * Mar. 31, 1992

[54] BLOW-MOLDING METHODS TO FORM CONTAINERS HAVING UPPER AND LOWER SECTIONS OF DIFFERENT THICKNESSES

[76] Inventor: Edward S. Robbins, III, 459 N. Court St., Florence, Ala. 35630

[*] Notice: The portion of the term of this patent subsequent to Jun. 6, 2006 has been disclaimed.

[21] Appl. No.: 400,140

[22] Filed: Apr. 29, 1989

Related U.S. Application Data

[60] Division of Ser. No. 332,994, Apr. 4, 1989, which is a continuation-in-part of Ser. No. 13,627, Feb. 11, 1987, Pat. No. 5,048,977, and a continuation-in-part of Ser. No. 123,325, Nov. 20, 1987, Pat. No. 4,836,970, which is a continuation-in-part of Ser. No. 8,658, Jan. 30, 1987, abandoned.

[51] Int. Cl.$^5$ .............................................. B29C 49/04
[52] U.S. Cl. ..................................... 264/505; 264/154; 264/167; 264/536; 264/541; 264/DIG. 33
[58] Field of Search ................ 264/541, 505, 506, 154, 264/536, DIG. 33; 425/525; 220/72

[56] References Cited

U.S. PATENT DOCUMENTS

| | | | |
|---|---|---|---|
| 1,555,115 | 9/1925 | Hand | 383/33 |
| 2,036,687 | 4/1936 | Fisher | 383/10 |
| 2,304,676 | 12/1942 | Bratring | 279/4.5 |
| 2,672,904 | 3/1954 | Hasselquist | 383/104 |
| 2,935,108 | 5/1960 | Hall | 220/72 |
| 3,077,295 | 2/1963 | Whiteford | 383/104 |
| 3,285,495 | 11/1966 | Colato | 206/45.34 |
| 3,608,032 | 9/1971 | Boultinghouse | 383/71 |
| 3,608,268 | 9/1971 | Lauritzen | 264/506 |
| 3,795,719 | 3/1974 | Morecroft et al. | 264/40.5 |
| 4,836,970 | 6/1989 | Robbins, III | 264/515 |

FOREIGN PATENT DOCUMENTS

| | | |
|---|---|---|
| 0129890 | 1/1985 | European Pat. Off. . |
| 0278764 | 8/1988 | European Pat. Off. . |
| 0279547 | 8/1988 | European Pat. Off. . |
| 553707 | 8/1933 | Fed. Rep. of Germany ........ 383/71 |
| 1511724 | 2/1968 | France . |
| 974596 | 11/1964 | United Kingdom ................. 264/541 |

OTHER PUBLICATIONS

Reid and Cochrane, Big Blow Molding, British Plastics, pp. 220–226, 5/1962.

Primary Examiner—Jan H. Silbaugh
Assistant Examiner—Catherine Timm
Attorney, Agent, or Firm—Nixon & Vanderhye

[57] ABSTRACT

A plastic container having base and sidewall portions is provided with corrugations as a unitary part of the sidewall portion. The sidewall portion is of a thickness that would not be capable of supporting itself without the unitary corrugations. The corrugations serve to rigidify, and this impart self-supporting capabilities to, the sidewall portion. The upper edge of the sidewall preferably includes a unitarily formed rim which assists in maintaining the sidewall in its generally tubular condition (and thus more easily facilitates the placement of articles in the container). The container may be closed by a flexible and gatherable terminal portion which is an integral extension of the rim or the upper edge of the sidewall. The containers of the invention are formed by an extrusion blow-molding technique using an appropriately configured blow mold.

2 Claims, 3 Drawing Sheets

BLOW-MOLDING METHODS TO FORM CONTAINERS HAVING UPPER AND LOWER SECTIONS OF DIFFERENT THICKNESSES

RELATED APPLICATIONS

This application is a division of U.S. application Ser. No. 07/332,994 filed on Apr. 4, 1989 which is a continuation-in-part of related copending and commonly owned U.S. application Ser. Nos. 07/013,627 filed on Feb. 11, 1987 and entitled "Ribbed Enclosure" now U.S. Pat. No. 5,048,977, and 07/123,325 filed on Nov. 20, 1987 and entitled "Method of Extrusion Blow-Molding Container Having Upper and Lower Sections of Different Thickness" now U.S. Pat. No. 4,836,970, this latter U.S. Application being a continuation of abandoned application Ser. No. 07/008,658 filed on Jan. 30, 1987 and entitled "Container"; the entire contents of each of these previously filed U.S. Applications being expressly incorporated hereinto by reference.

FIELD OF THE INVENTION

The present invention generally relates to containers and to methods for forming the same. More specifically, the present invention is related to disposable and/or reusable containers formed of plastic material and to methods for the extrusion blow-molding of the same. In preferred forms, the present invention will be embodied in containers having a base portion and a sidewall portion extending upwardly of the base portion, the sidewall portion being of a thickness substantially less than the thickness of the base portion, and having longitudinally extending corrugations. These corrugations impart self-supporting characteristics to the relatively thin, and otherwise non-self-supporting, sidewall portion.

BACKGROUND AND SUMMARY OF THE INVENTION

Different types, styles, and constructions of containers have long been known and used in the past. Likewise, many different materials have been used in the manufacture of containers. For example, the common paper bag, comprised of four side walls, and a bottom wall formed from overlapping and glued flaps of paper, is a well known construction eminently suitable for its purpose. Cardboard containers, such as boxes, are also quite common and have been provided in various configurations and constructions for a variety of purposes. Plastic containers, such as bottles for holding liquids or thin film plastic bags for disposing of trash, are likewise well known and variously constructed and used.

Containers formed of plastic materials have significant advantages in comparison with prior paper or cardboard containers. For example, plastic containers are strong, resilient, long-lasting, and inert to most items disposed in the container. They are also suitable for containing and confining fluid materials. Additionally, plastic containers are currently produced at extremely low cost and are therefore well suited for disposal after use. Common plastic containers of the thin film type, however, have a number of disadvantages in comparison with paper or cardboard containers in that the latter are generally self-supporting or free-standing in their intended shape. On the other hand, containers formed of thin plastic film are generally not capable of assuming or maintaining a predetermined shape.

Further, paper, cardboard and plastic bags are not suitable in many environments for use alone and thus must be used in conjunction with other containers or support structure. For example, it is common practice to provide a container formed of a relatively rigid plastic material and then to line the container with a paper or thin film plastic bag. Paper bag liners, of course, sometimes lack sufficient strength, resilience and the capacity to contain and confine liquid materials. Plastic bag liners, on the other hand, are easily punctured by the contents of the container. In certain applications, for example, trash disposal, it is also necessary to lift the paper or plastic liner from the supporting container and replace it with a fresh paper or plastic bag liner. Paper or plastic bag liners frequently break or tear when lifted from a supporting container. Tearing is often caused by depositing material into a plastic liner. Frequently, in the case of paper liners, tearing occurs by a weakening of the bag in the areas where liquid has absorbed. Additionally, when such paper or plastic liners fail, the supporting container usually must be cleaned (particularly if the liners were intended to be used as trash receptacles).

Thin film plastic bags or containers are also typically used by themselves—that is, without any additional supporting structure. However, because these bags are not self-supporting or free-standing, it is usually quite difficult to fill them in the absence of any ancillary supporting structure (i.e., since the bags tend to collapse upon themselves without such supporting structure). For example, thin film plastic bags are commonly used for disposing of leaves. However, filling these bags with leaves or even maintaining the bag open for filling purposes is difficult because the bags will collapse absent a supporting structure.

According to the present invention, however, a container is provided which includes a self-supporting side wall. This side wall is, moreover, thin-walled—that is, the gauge thickness of the sidewall is sufficiently thin so that the sidewall is normally non-self-supporting. Nonetheless, the self-supporting characteristics are imparted to the sidewall according to the present invention by means of unitarily formed and longitudinally extending corrugations. These corrugations therefore serve to rigidify the sidewall along its longitudinal extent.

The sidewall extends upwardly from a relatively thicker base portion. This base portion is present so as to provide stability to the containers of this invention so that the self-supporting capabilities of the sidewall may be fully realized.

Preferably, the upper edge of the side wall terminates in an annular rim which lies in plane substantially transverse to the longitudinal dimension of the corrugations. The rim serves to maintain the sidewall in an opened configuration and thus more easily allow waste, articles and the like to be deposited into the container's interior space (i.e., the space bounded by the sidewall). The rim is preferably of the same thickness as that of the sidewall but is formed into an outwardly directed U-shaped configuration. The outward appearance of the rim will therefore be an aesthetically pleasing smooth convexity.

A terminal flexible section is preferably joined to the rim. This flexible section is of sufficiently thin gauge (e.g., approximately the same wall thickness as the sidewall) so that it may be folded downwardly and lie adjacent the exterior periphery of the sidewall. However, when the containers of this invention are desired to be closed, this flexible section may then simply be gathered together at the container top and tied.

The containers of this invention are, moreover, of a one-piece (i.e., unitary) construction. That is, the base portion, sidewall portion and, if present, the rim and flexible terminal section are each unitary with one another. This unitary construction is most conveniently achieved by means of an extrusion blow-molding method using suitably configured mold platens (to be described later).

These, and other, aspects and advantages will become more clear after careful consideration is give to the following detailed description of the preferred exemplary embodiments of the present invention.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
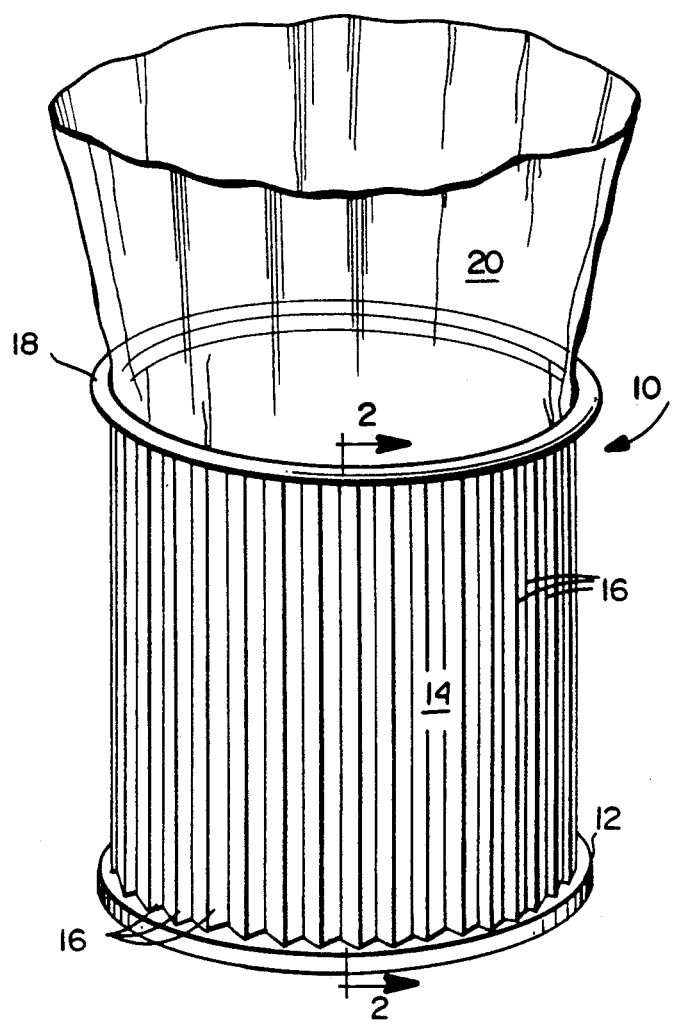
FIG. 1 is a perspective view of one preferred form of a container according to the present invention.

Accompanying FIG. 1 shows a particularly preferred container 10 according to the present invention. As is seen, the container 10 is generally comprised of a relatively thick transverse base portion 12 and a relatively thin tubular sidewall portion 14 unitarily joined along its lower edge to the base portion 12. The sidewall portion 14 therefore is an integral tubular extension of the base portion 12.

By the term "thin-wall" (or similar terms) is meant that the material is sufficiently thin so that the structure is not normally capable of supporting itself in an upright open condition. Self-supporting capabilities are, however, imparted to the thin sidewall portion 14 via a number of longitudinally extending (i.e., parallel to the elongate central axis of the container 10) corrugations, a representative few of which are identified in accompanying FIG. 1 by reference numeral 16. The corrugations are, moreover, unitarily formed in the thin sidewall portion 14 in a manner to be described later. These corrugations serve to rigidify the otherwise flexible sidewall portion 14 along its longitudinal extent and thus imparts self-supporting capability thereto.

The upper edge of the sidewall portion 14 is formed into a unitary rim 18 which lies in a plane substantially transverse to the longitudinally extending corrugations 16. As is perhaps best seen in FIG. 2, the rim 18 is preferably U-shaped so as to form an outwardly disposed convexity. The rim 18 is, moreover, unitarily joined to (i.e., is one-piece with) the side sidewall 14 at its lower end. Preferably, the rim has a greater thickness as the sidewall portion 14, but it may have substantially the same thickness as the sidewall portion 14, if desired. The transverse rim 10 serves to rigidify the upper edge of sidewall 14 and thus serves to maintain the upper edge of sidewall 14 in an opened configuration so as to allow waste, objects and the like, to be deposited in the interior of container 10 (i.e., within the space laterally bounded by the sidewall 14).

The other (upper) end of the U-shaped rim 18 is preferably unitarily joined to a non-corrugated flexible section 20. The section 20 is preferably about the same gauge thickness (more or less) as compared to the gauge thickness of the sidewall portion 14. However, because the section 20 is not formed with corrugations 16 in a manner similar to sidewall 14, it is non-self-supporting—that is, the section 20 is sufficiently flexible so that it may be draped downwardly along the exterior periphery of the sidewall portion 14. This more easily permits objects to be deposited into the container 10, but will allow the container 10 to be closed as by gathering the flexible section 20 and tieing it in a closed condition as is shown in FIG. 3.

As representative non-limiting examples, the base portion 12 may be formed so that it's thickness is about 0.015 inch, the sidewall portion 14 (and rim 18) may be formed so that it is about 0.002 inch thick. The flexible section 20, on the other hand, is preferably formed so that its thickness is approximately the same as the thickness of the sidewall portion 14.

Figure 3:
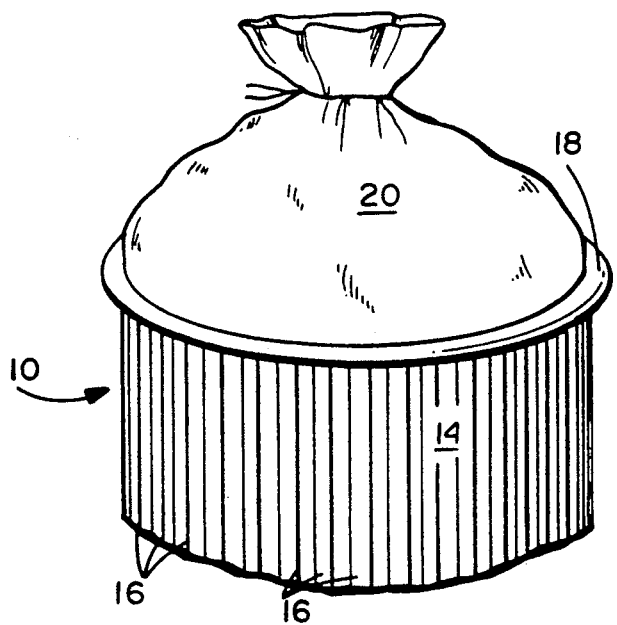
FIG. 3 is a partial perspective view of the container shown in FIG. 1, but showing the flexible upper section thereof in a gathered condition.
Figure 2:
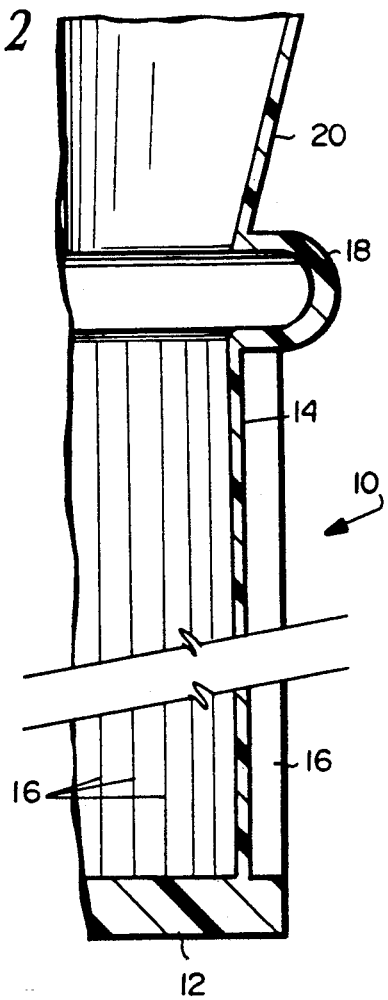
FIG. 2 is a segmented cross-sectional elevational view of the container shown in FIG. 1 as taken along line 2—2 therein.
Figure 4:
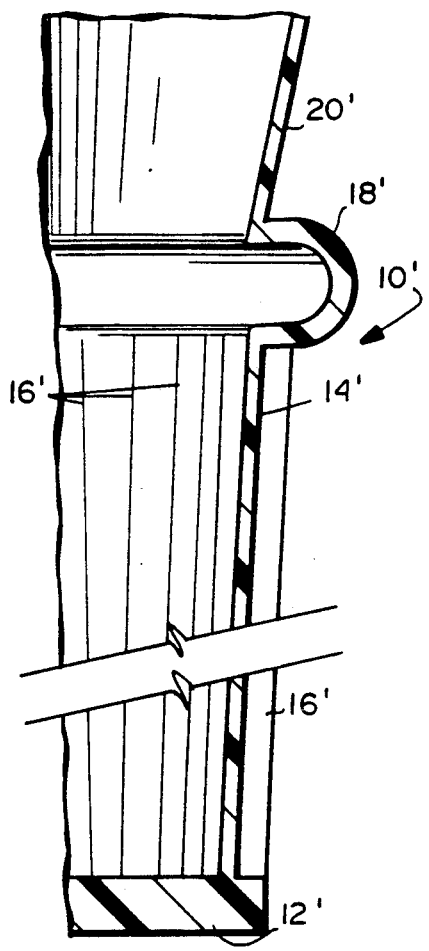
FIG. 4 is a segmented cross-sectional elevational view of another possible embodiment of a container according to this invention.

FIGS. 1-3 depict an embodiment of a container 10 in which the sidewall portion 14 is a vertical tubular extension of the base 12. However, "tapered" sidewalls may also be provided. For example, as is shown in accompanying FIG. 4, the sidewall portion 14', in cross-section, is downwardly and inwardly tapered from the rim 18' towards the base 12'. That is, the sidewall portion 14' of the container 10' shown in FIG. 4 is a segment of an inverted cone. Like the container 10, the container 10' will include longitudinally extending unitary corrugations 16', and optionally, a flexible section 20' extending unitarily from the rim 18'. The tapered sidewall portion of container 10' shown in FIG. 4 allows a number of containers 10' to be nested with one another thereby facilitating their transport and/or storage prior to use.

Figure 5:
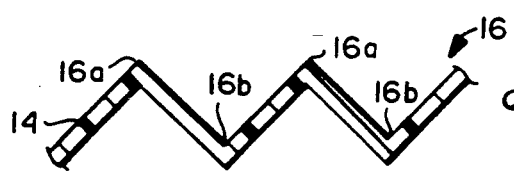
FIGS. 5-7 are each a partial cross-sectional plane view of possible corrugated configurations which may be employed as the sidewall portion of the containers of this invention.
Figure 6:
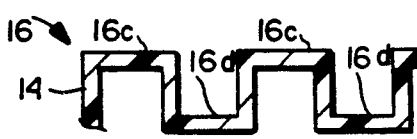
Figure 7:
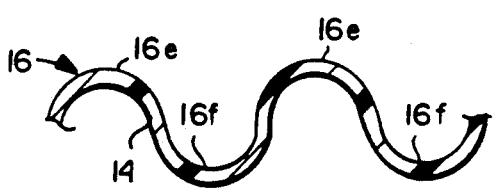

As mentioned previously, the gauge thickness of the sidewall portion 14 is such that it would normally not be capable of supporting itself in an upright condition. However, according to the present invention, longitudinal structural rigidity is imparted to the otherwise non-self-supporting sidewall portion 14 by means of longitudinally extending corrugations 16. FIGS. 5-7 show representative forms of the corrugations 16. For example, the corrugations 16 may be formed so that in cross-section, a number of alternative triangular peaks and valleys 16a, 16b, respectively, are present (FIG. 5); or a number of rectangular-shaped plateaus and recesses 16c, 16d, respectively, are present (FIG. 6); or a number of smooth convexities and concavities 16e, 16f, respectively, are present (FIG. 7).

As will be appreciated, these corrugations impart structural rigidity in the longitudinal direction of the sidewall portion 14. As such, the sidewall portion 14 is capable of being maintained in an upright condition without necessarily requiring additional structural support for such purpose. Without such corrugations 16, however, the sidewall portion 14 would be non-self-supporting due to its relatively thin gauge thickness. Hence, by means of the present invention, thin-walled containers which are self-supporting are provided without resorting to the extra expense of increased plastic material so as to achieve such self-supporting capabilities.

Figure 8:
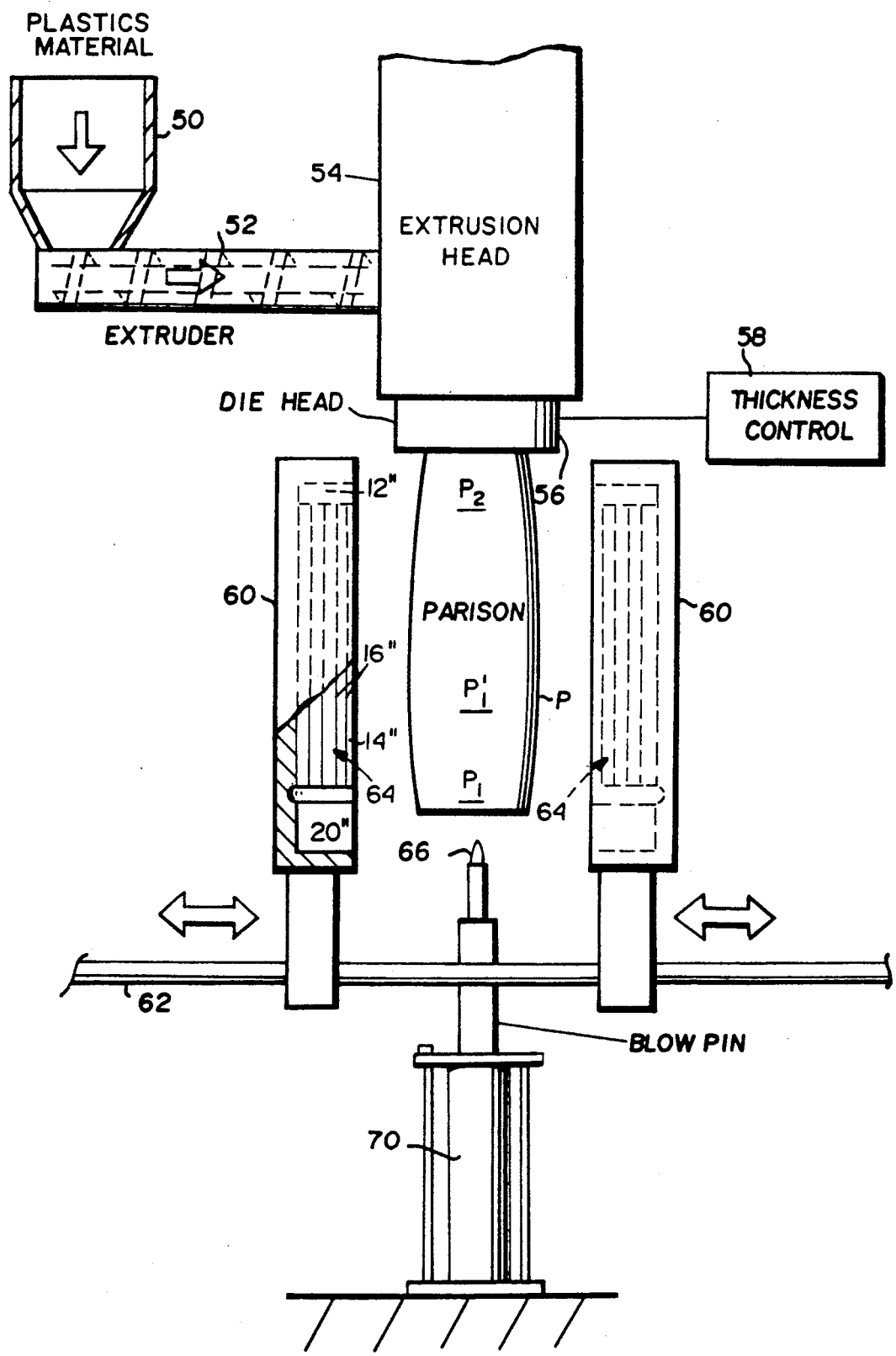
FIG. 8 is a schematic view of an extrusion blow-molding process for forming the containers of this invention.

Accompanying FIG. 8 schematically depicts a method for the extrusion blow-molding of containers according to the present invention. As is seen, plastics material (usually in the form of pellets or granules) is contained in a hopper 50 which feeds the plastics material to a screw extruder 52. As is notoriously well known, the screw extruder 52 thoroughly fluxes and plasticizes the plastics material via a rotatable screw within the extruder's barrel. The plasticized material is then transferred to an extrusion head 54 equipped with a die head 56. The die head 56 includes a variable width slit formed between two mold parts, the slit being in the general shape of a circle (but other geometric shapes may be employed). Control over the width of the slit in the die head 56 is accomplished by means of a thickness control unit 58.

Located below the die head 56 is a pair of mold platens 60 which are mounted for reciprocal movements towards and away from each other by means of a guide structure 62. Preferably, a hydraulic mechanism (not shown) connected to the mold platens 60 moves them towards and away from one another. The mold platens 60 define interior mold surfaces 64. When the mold platens are moved into a molding position (i.e., when the platens 60 are closed), these mold surfaces 64 will therefore collectively define the shape and structural features of the final container product. For example, if the mold platens 60 are configured to form a container 10 as described above with reference to FIGS. 1-3, the mold surfaces 64 will define surfaces 12", 14", 16", 18" and 20" which respectively define a negative image of the base portion 12, sidewall portion 14 with its corrugations 16, rim 18 and flexible section 20. Thus, these surfaces will collectively define a negative image of the container 10 discussed previously.

A height-adjustable blow pin 66 is situated below the the die head 56 and the mold platens 60. Height adjustment of the blow pin 66 is achieved by means of hydraulic mechanism 70. The blow pin 66 blows air (or other suitable fluid) into the parison P when the mold platens 60 are closed (i.e., during a blow molding operation). Although the blow pin 66 is shown in FIG. 8 as being located below the parison P, it could equally be situated above the parison P in which case it will extend downwardly into the interior of the parison P.

To form the containers according to the present invention, plastics material is fed from hopper 50 into the screw extruder 52 where the material is plasticized and is then directed to the extrusion head 54. The plasticized material is then extruded through the slit (not shown) in the die head 56, preferably in the form of a cylindrical parison P, open at its bottom end. At this point in the molding operation the mold platens are in an opened condition (e.g., as is shown in FIG. 8). When a suitable length of parison P has been extruded from the die head 56, the blow pin 66 is raised so that it enters the parison P via its open bottom end and is situated in the interior of the parison P. At this point in the molding operation, the mold platens are moved along the guide structures 62 so that they close around the parison P. Air is then ejected from the blow pin 66 into the interior of the parison P to inflate it and cause it to conform to the mold surfaces 64 of the mold platens 60. It will be appreciated that the closing of the mold platens 60 pinches off the upper end of the parison P and the inflation of the parison P forms closed upper and lower ends within the mold platens 60.

During formation of the parison P, the thickness control means is operated so that the initial portion of the parison (i.e., portion P1) is formed of predetermined thickness. Portion P1 will therefore eventually form the flexible section 20 of the container 10 described previously. If it is desired for the sidewall portion 14 to have a thickness greater than that of the flexible section 20, the thickness control means 58 may then be operated such that a second parison portion P1' is formed having the desired greater thickness as compared to the thickness of the plastic material forming parison portion P1. Otherwise, if the sidewall portion 14 and the flexible section 20 are to be formed of substantially equivalent thicknesses, then the control means 58 remains the same—that is, so that the thickness of parison portions P1' and P1 are substantially the same.

As the parison P continues to increase in length, the thickness control means 58 will ensure that the thickness of the material which will eventually form the flexible portion 20 and the sidewall portion 14 of the container 10 is correct. That is, the thicknesses of parison portions P1 and P1' will be controlled via the control means 58. At the appropriate time—that is, when the parison P has increased in length to the extent that the material which will eventually form the base portion 12 is to next be extruded from die head 56—the control means 58 causes the slit in the die head to dimensionally increase so that the parison portion P2 will have a substantially greater thickness as compared to the thickness of parison portions P1 and/or P1'.

Consequently, it will be appreciated that the molding of the container 10 shown here in accompanying FIG. 8 is accomplished in an inverted manner—that is, material ultimately forming the flexible portion 20 is extruded before the material ultimately forming the sidewall portion 14, while this latter material is extruded before the material ultimately forming the base portion 12.

Once the molding operation has been completed, and the molded container has cooled sufficiently, the mold platens 60 may be moved away from one another and the container 10 removed therefrom. Final cutting and or trimming (e.g., to remove excess plastic material and/or to form the open end of the container) may then be accomplished.

It will be appreciated that containers 10 according to the present invention do not necessarily need the flexible upper region 20 as described above (although it is preferred that the containers 10 have such flexible sections 20 for purposes of closure). In such situations, the technique described above is employed, except that the mold platens 60 that are used do not include a smooth segment corresponding to the flexible section 20. In addition, the control means 58 is operated so that only parison portions P1 and P2 are formed, with portion P1 being less in thickness as compared to portion P2 as previously described.

In any case, the mold surfaces 64 will be formed with convoluted surfaces which correspond to the desired corrugations 16 to be formed as a unitary part of the side wall 14. As will be appreciated, with the mold platens closed, the plastic material will be forced via the air ejected from the blow pin 66 to conform to the convolutions of the mold surfaces 64 thereby forming the corrugations 16. Upon cooling therefore, these corrugations remain as a unitary structural feature of the sidewall portion 14.

The containers 10 of the present invention may be formed of any suitable thermoformable plastic, such as polyethylene, polypropylene, and the like. The selection of any particular plastic material will be dependant upon a number of factors, including the end-use environment for the container and economics involved in producing the containers.

In addition, although the container 10 has been shown in the accompanying FIGURES as being substantially cylindrical, other geometric configurations are possible depending upon the geometric configurations of the mold platens 60 that are employed during production.

Therefore, while the invention has been described in connection with what is presently considered to be the most practical and preferred embodiments, it is to be understood that the invention is not to be limited to the disclosed embodiments, but on the contrary, is intended to cover various modifications and equivalent arrangements and methods included within the spirit and scope of the appended claims.

What is claimed is:

1. A method of making a plastic container comprising a base portion, and a sidewall portion formed as a unitary tubular extension of said base portion, said sidewall portion unitarily including a self-supporting region having a number of longitudinally extending corrugations whereby the container may stand upright, and a non-corrugated flexible region having an open upper end, said method comprising the steps of:

forming said base and sidewall portions by extruding a plastics material to form sequentially continuous first and second portions of a parison having first and second wall thicknesses, which thicknesses will ultimately form said base portion and said sidewall portion, and said thickness which will ultimately form said sidewall portion being substantially less than said thickness which will ultimately form said base portion such that said sidewall portion is normally non-self-supporting while said base portion is normally self-supporting;

disposing said parison portions in a blow mold having mold walls configured to form said base portion and said corrugations in said self-supporting region, and said non-corrugated flexible region of said side wall portion;

imparting self-supporting capabilities to said normally non-self-supporting sidewall region by urging the first and second parison portions into respective conformance with the mold walls to form said base portion, said non-corrugated flexible region, and said self-supporting region having said unitary longitudinally extending corrugations, wherein the parison portion of said substantially less thickness forms said sidewall region having said unitary longitudinally extending corrugations and thereby imparts self-supporting capabilities thereto;

removing said formed container from said blow mold; and removing a portion of said plastics material from the upper end of said container to form said open upper end thereof, whereby said container is formed.

2. A method of making a plastic container comprising the steps of:

substantially simultaneously forming integral first, second and third generally tubular container portions in a single continuous process, wherein said first container portion includes a base portion, said second container portion includes a sidewall portion, and said third container portion includes a flexible terminal portion; wherein the step of forming said first container portion including the step of forming said base portion of a plastic material of a predetermined thickness; the step of forming said second container portion includes the step of forming said side wall portion from said plastic material of a predetermined thickness substantially less than said predetermined thickness of said first portion but as an integral extension thereof, and also includes forming integral longitudinally extending corrugations in said side wall portion which impart self-supporting capabilities to said sidewall portion, and the step of forming said third container portion includes the step of forming said flexible terminal portion from said plastic material of a thickness which is not greater than the thickness of said sidewall portion;

said steps of forming said first, second and third container portions in a single continuous process includes continuously extruding first, second and third parison portions, the thickness of said second and third parison portions being substantially less the thickness of said first parison portion, and the thickness of said third parison portion being no greater than the thickness of said second parison portion;

disposing said first, second and third parison portions in a blow mold having mold walls, and urging said first, second and third parison portions into conformance with the mold walls to form the container having said integral first, second, and third container portions, and allowing the molded container portions to cool in the mold sufficiently whereby the container may be removed, and then removing the container from the mold.

* * * * *